Dec. 18, 1962     B. VER NOOY     3,068,725
DRILLING APPARATUS
Filed Oct. 13, 1960     3 Sheets-Sheet 1
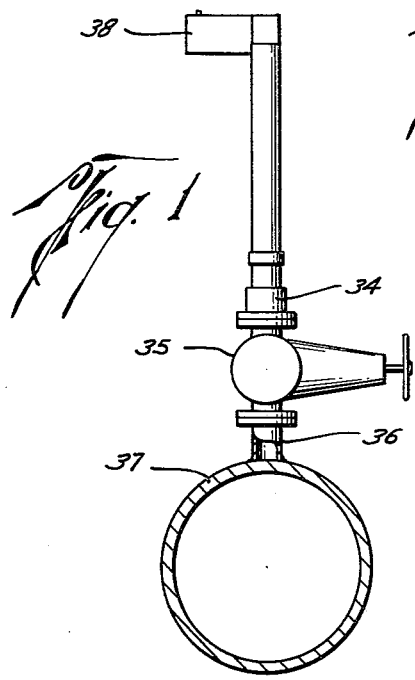
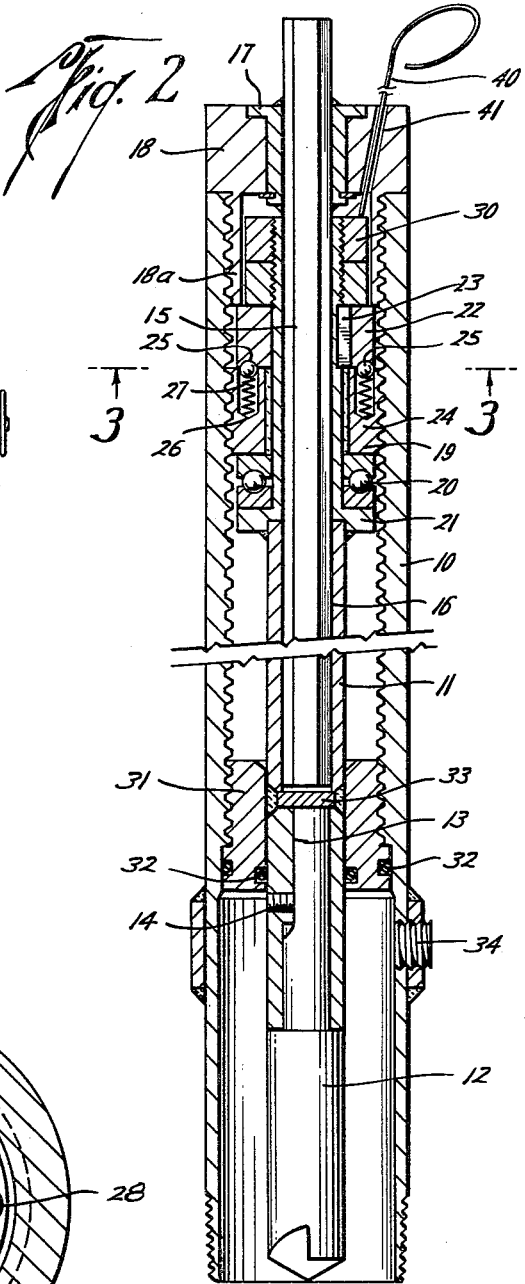
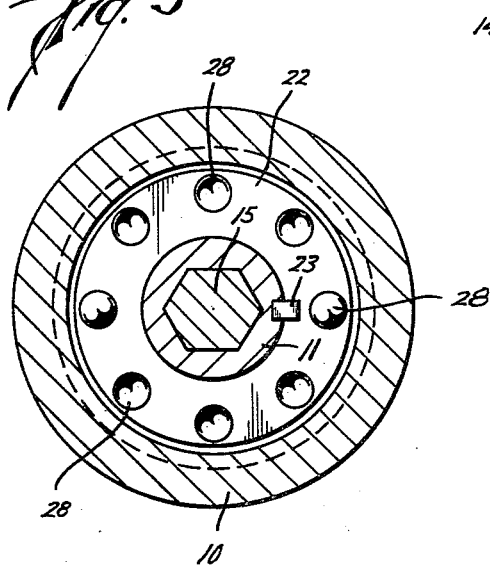
Burton Ver Nooy
INVENTOR.
BY Browning, Jenens, Hyer & Eickenroht
ATTORNEYS

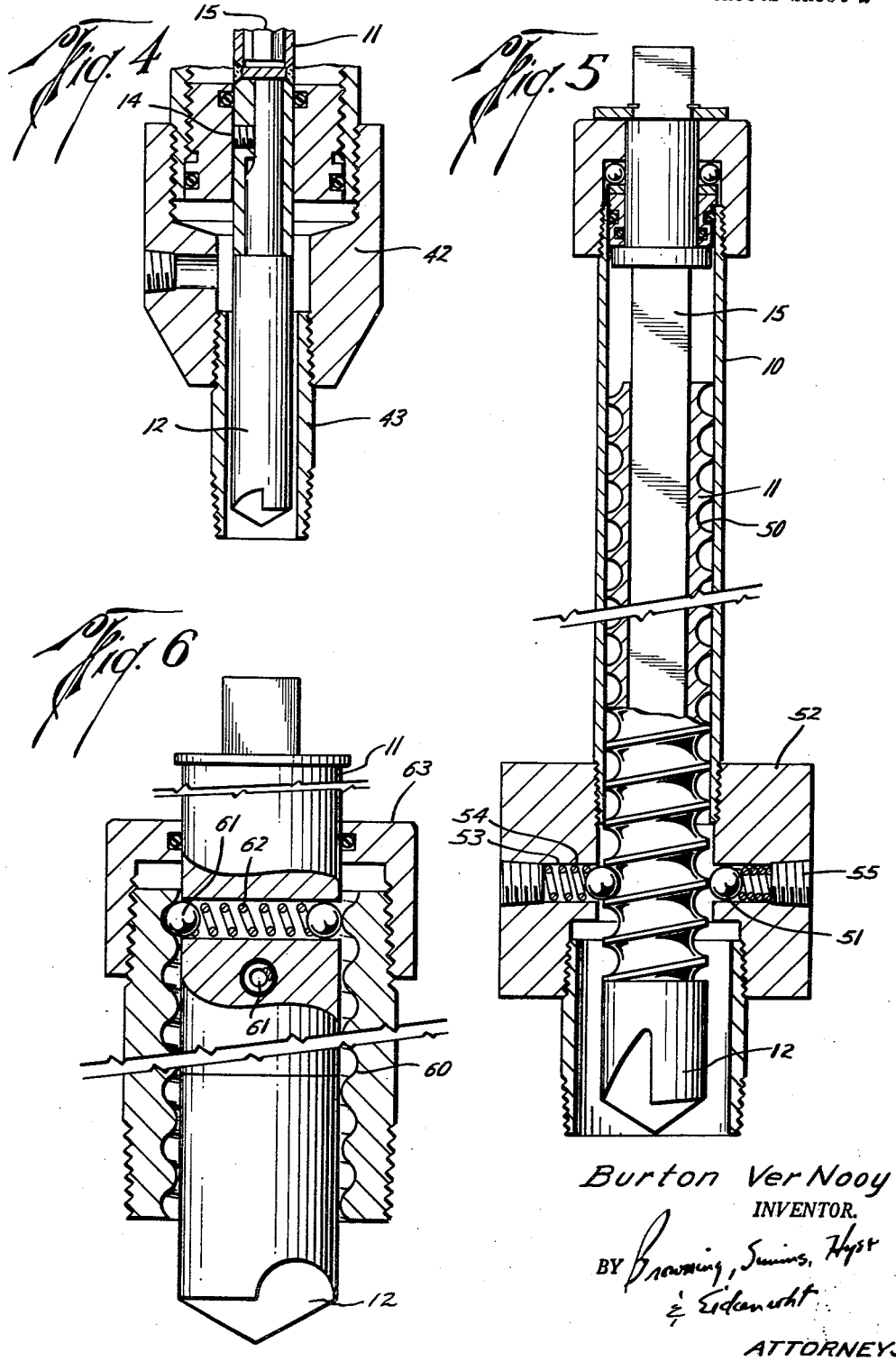

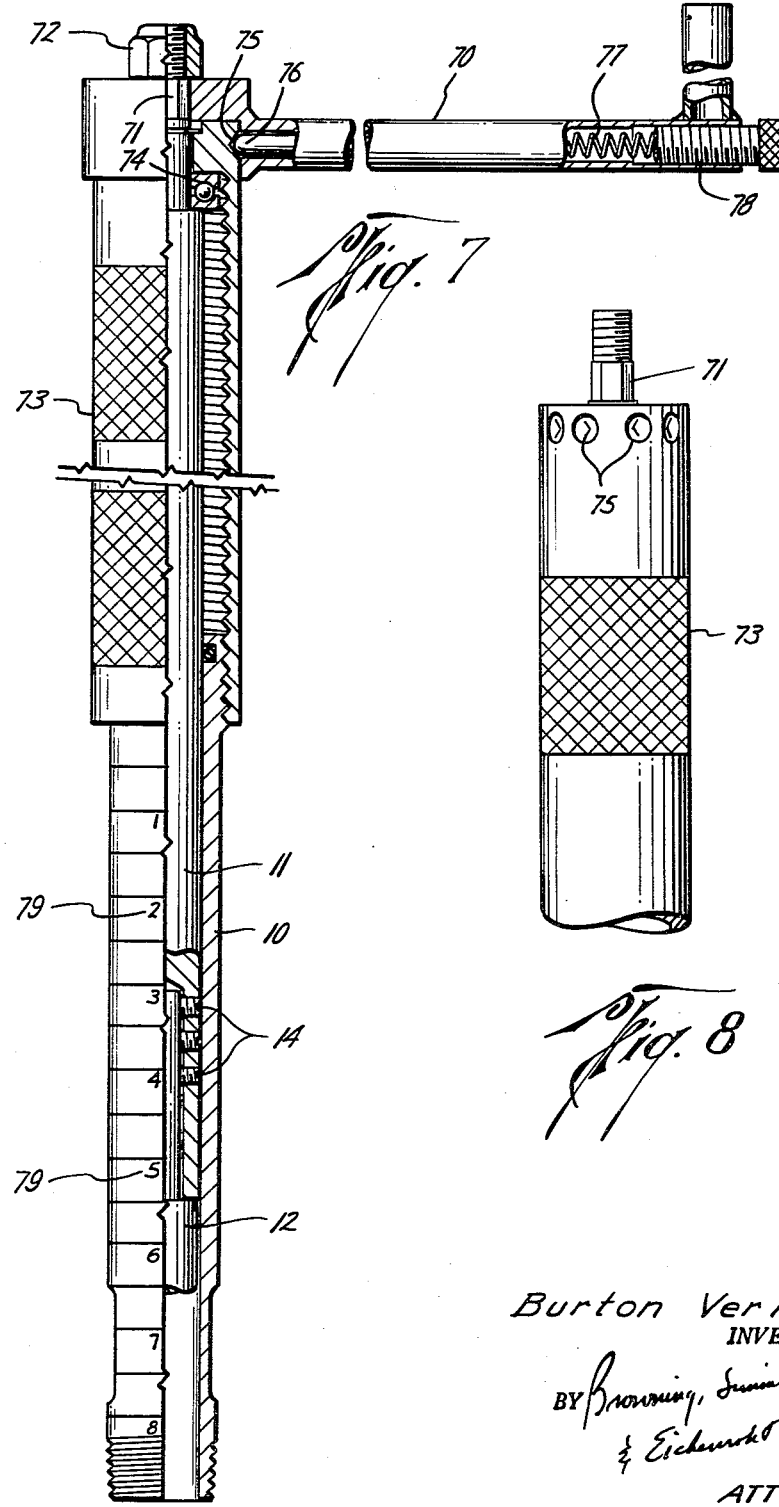

United States Patent Office 3,068,725
Patented Dec. 18, 1962

3,068,725
DRILLING APPARATUS
Burton Ver Nooy, Tulsa County, Okla., assignor to T. D. Williamson, Inc., Tulsa, Okla., a corporation
Filed Oct. 13, 1960, Ser. No. 62,505
15 Claims. (Cl. 77—38)

This invention relates to an apparatus for drilling a hole or opening in a vessel, such as a pipe or the like, while preventing any substantial flow of fluid into or out of the vessel.

The cutting or drilling of a hole through the wall of a vessel or pipe while the same contains a fluid under pressure is commonly termed "hot tapping." Such tapping is usually performed in those instances where it is desired to make a connection to the vessel or pipe without taking the latter out of operation and removing pressure fluid therefrom. For example, hot taps are often resorted to in connecting into a pipe-line carrying a petroleum fluid so as not to be forced to shut down the pipeline, drain and steam the same and then place it back in operation after the connection has been made. These hot taps are usually made by first welding a stub pipe or split T to the vessel or pipe to be tapped and then mounting a tapping valve on the stub or on the branch of the T. The tapping apparatus is next mounted on the valve and its cutter run through the open valve to cut the opening in the vessel or pipe. After the opening has been cut, the cutter is retracted and the valve closed after which the tapping apparatus can be removed without any substantial leakage of fluid into or out of the vessel.

While tapping or drilling apparatus for performing this function is available upon the open market today, such apparatus is relatively complicated and expensive to build. The greater degree of complexity of this prior apparatus inevitably results in its being of substantial weight so that its use is proportionately difficult. Also, the apparatus is not readily susceptible of manufacture in small sizes at an acceptable cost as is particularly desired for supplying tapping apparatus to the general utility industry such as for tapping ordinary water and gas mains and distribution lines. It is therefore an object of this invention to provide a drilling or tapping apparatus which is relatively simple and easy to construct and operate and which can be of light weight and yet able to withstand high fluid pressures which may be encountered in cutting the hole or making the hot tap.

Another disadvantage of such prior tapping apparatus arises from the manner in which the cutter feed mechanism is constructed. Thus, the feed mechanism is a positive drive in that the cutter is advanced a predetermined distance for each revolution thereof irrespective of the ease or difficulty of cutting. In other words, the cutter is fed into the work piece at a constant lineal feed rate during both light and heavy cutting duties. As a result, the cutter is fed too slowly during the light cutting duty and too fast during the heavy cutting duty. The latter has resulted in burning or breaking away of the cutting teeth or elements so as to either destroy or reduce the cutting efficiency of the cutter.

Since the feed rate during the cutting operation must be relatively slow, and since the cutter must be advanced and retracted a considerable distance through the tapping valve and stub before and after the cutting operation, it has been conventional to provide a two-speed feeding mechanism. The high speed feed mechanism is used to rapidly advance or retract the cutter with respect to the work piece and the low speed feed mechanism is used during the actual cutting operation. Since the drive during both of these operations is positive, there have been instances where the operator miscalculated the distance the cutter was to be advanced at high speed with a result that the cutter was jammed into the work piece. This, of course, is apt to damage and has damaged the cutter.

It is therefore another object of this invention to provide a drilling apparatus in which the feed rate is automatically varied to maintain substantially constant the cutter drilling force exerted on the work piece during the drilling operation whereby the feed rate can increase during the period of light drilling duty and decrease during the period of heavy drilling duty.

Another object is to provide a drilling apparatus which will advance the cutter at a relatively high feed rate until it reaches the work piece and then will automatically reduce the feed rate to one which is proper for the actual cutting operation without requiring the operator to determine the distance the cutter must travel at high feed rate, thereby eliminating any chance for jamming the cutter into the work piece.

Another object of the invention is to provide a drilling apparatus of this type which automatically limits the maximum bit drilling force which can be applied by the bit to the work piece.

Another object of the invention is to provide such a drilling apparatus which, during normal drilling, maintains the torque required to turn the bit or cutter at a substantially constant value.

Another object is to provide a drilling apparatus arranged so that insignia can be simply scribed or placed on a portion of the housing so as to permit an easy, yet positive determination of the depth of cut or distance of travel of a boring bar without any special mechanisms for such.

Another object of the invention is to provide an apparatus of this class which can be light in weight and simple and cheap in construction, but which is rugged and dependable.

Another object is to provide such an apparatus which is so constructed as to be susceptible to only a minimum of abuse or improper operation by inexperienced personnel.

Other objects, advantages and features of this invention will be apparent to one skilled in the art upon consideration of the specification, the claims and the attached drawings wherein:

FIG. 1 is an elevational view illustrating one form of the apparatus mounted in position to make a hot tap in a pipe;

FIG. 2 is a vertical sectional view illustrating a preferred embodiment of the invention;

FIG. 3 is an enlarged view taken on a line 3—3 of FIG. 2;

FIG. 4 is a view showing a modified form for the lower end of the apparatus shown in FIG. 2 and demononstrates how the apparatus may be connected to tapping valves of various sizes;

FIG. 5 illustrates another embodiment of the invention;

FIG. 6 illustrates still another embodiment;

FIG. 7 illustrates still another embodiment which is simpler in some respects and which specifically provides for a simple means for determining the boring bar travel; and FIG. 8 is a view of the upper part of the apparatus of FIG. 7, but with the handle and nut removed to better show arrangement at the upper end of the feed sleeve.

Referring first to FIG. 2, the illustrated drilling machine includes a housing 10 in which a boring mechanism is rotatably mounted so as to be both rotatable and movable longitudinally of the housing. The illustrated boring mechanism includes a boring bar 11 for carrying a bit or cutter 12. The bit can be attached to the boring bar in any one of several ways, one of which is here illustrated as including a flat 13 on the bit shank adapted to fit up into correspondingly shaped opening in the boring bar. The bit is held against dropping out by a set screw 14.

As a part of the boring mechanism, a means for rotating the boring bar can be provided. In FIG. 2 this is illustrated as a drive shaft 15 of non-circular (e.g. hexagonal) cross section telescoping within a correspondingly shaped bore 16 in the boring bar. The drive shaft is connected to a bushing 17 rotatably received in a cap 18 at the top of the housing. With this construction, it will be seen that by turning drive shaft 15, the boring bar will be rotated and yet s free to move longitudinally of the housing and the drive shaft.

Means are provided for feeding the boring mechanism longitudinally of the housing and includes a means for maintaining the bit drilling force substantially constant by automatically varying the rate of feeding by the boring mechanism. The "cutter or bit drilling force" can be defined as the total thrust of the bit or cutter against a work piece in which a hole is being drilled. The "cutter reaction force" can be defined as being equal to but acting in an opposite direction from the cutter drilling force.

Returning now to FIG. 2, the feed means is illustrated as including nut 19 threaded to the interior of the housing so that as the nut is revolved, it will move downwardly or upwardly in the housing. The nut has an endwise force-transmitting connection with the boring bar and this is here illustrated as including a thrust bearing 20 resting on a shoulder 21 on the boring bar and engaged on its upper side by nut 19. Also included as a part of the feed means is a clutch part 22 carried for rotation by the boring bar as being affixed thereto by a key 23. The upper end of nut 19 has another clutch part 24 integrally connected thereto and carrying a plurality of balls 25 in bores 26. These balls are resiliently urged toward clutch part 22 by suitable resilient means such as springs 27 so that they present protrusions from the upper face of clutch part 24. The lower face of clutch part 22 is provided with a plurality of depressions 28 which are here illustrated as semi-spherical dimples equal in number and having the same angular spacing as the balls so that each receives an upper portion of a corresponding one of balls 25 to provide a torque transmitting engagement between the clutch parts. The drive assembly can be maintained in place by a pair of lock nuts 30.

With the foregoing construction, it will be seen that by rotating the boring bar, the friction clutch, comprising clutch parts 22 and 24 and the spring pressed balls 25, tends to turn nut 19. The balls will be maintained in dimples 28 so that nut 19 is rotated at the same speed as the boring bar as long as the torque required to turn the nut is less than a certain value. However, when the torque exceeds this value, the balls will be forced downwardly out of the dimples, permitting the upper clutch part to rotate relative to the lower clutch part, thereby resulting in slippage of the clutch. This relative rotation will continue as long as the torque required to turn the nut exceeds the torque transmitting capacity of the balls when they are in the dimples in that each time the balls move into the dimples, the excess torque requirement will cause them to move out. Thus, as long as the torque requirement to turn the nut is higher than that which can be transmitted without slippage, the dimples will in effect transmit a series of impact blows to the balls and hence to the nut to tend to turn the latter. While it is theoretically true that the nut is turned under these conditions by this series of blows, the slippage of the clutch during the actual drilling will ordinarily be rapid enough that the nut will respond as though a continuous torque were being exerted on it.

In a preferred form of the invention, the friction clutch is arranged so that the torque which can be transmitted without slippage is at least as great as that required to turn nut 19 at the same rate of speed as the boring bar while the latter is being advanced toward the work piece or is being retracted therefrom. More briefly, the clutch does not slip except during the actual cutting operations. In this manner, the boring bar can be fed at a relatively high rate toward and away from drilling position. However, upon the cutter or bit reaching the work piece, the friction clutch will start slipping and will continue to slip during substantially all of the drilling operation. Accordingly, the torque transmitting capacity of the clutch, without slippage, should be less than that required to maintain a desired bit drilling force. In a less preferred form, the clutch is constructed so that there is slippage during movement of the bit to and from cutting position but such slippage is considerably less than that occurring during drilling. In this manner, the movement of the bit to and from cutting position is still maintained at a rate which is considerably greater than that during actual cutting, although it is one which is less than when there is no slippage.

It will be seen from the above that as the bit is drilling, a substantially constant bit drilling force will be exerted on the bit urging it into the work piece throughout the drilling operation. If the resistance to drilling should decrease for any reason, the linear feed rate will likewise automatically increase and vice-versa. An increase in the difficulty of drilling merely means that the clutch will slip at a higher rate than normal and a decrease in drilling difficulty will result in less than normal clutch slippage.

It should be noted at this point that the friction clutch has been found to deliver a substantially constant torque to the nut at slippage rates varying from substantially none to a very high rate.

Since the drilling apparatus is to be used to cut a hole in a vessel while preventing flow of fluid into or out of the vessel, the housing is formed so as to provide a fluid-tight closure with the vessel. In FIG. 2, the lower end of the housing is made fluid-tight by a bushing 31 screwed into the housing and sealed with both the housing and the boring bar as by seals 32. A partition 33 is provided across the bore of the boring bar to prevent flow of fluid through such bore. A plugged tap 34 can be provided so that a valve can be connected, after removing the plug, to the housing to permit fluid to be vented therefrom, particularly after completion of the tapping operation.

With the construction shown in FIG. 2, the lower end of the housing can be screwed into screw flange 34 as shown in FIG. 1. The apparatus is then bolted upon a tapping valve 35 which in turn has been bolted to a stub 36 connected to pipe 37. Then upon applying power to rotate drive shaft 15 as by a motor 38, and with valve 35 open, the boring bar will be rapidly fed downwardly to move bit 12 toward pipe 37. When the bit contacts pipe 37, the feed rate will automatically decrease during the drilling operation and will be maintained to be such as to maintain a constant bit drilling force. Upon completion of the tap, motor 38 can be reversed which causes the boring bar and bit to be retracted at relatively high rate until the bit is retracted into the housing. It will be noted that should the motor not be turned off immediately upon completing retraction of the boring bar, clutch part 22 will merely engage cap extension 18a thereby stopping upward movement of the boring bar, after which the clutch will slip until the motor is shut off. Thus, there will be no jamming of the mechanism.

It is contemplated that the maximum force transmissible by the friction clutch can be adjusted to a desired value by changing the size and number of balls and dimples, the extent to which the balls may seat in the dimples, and the force exerted by springs 27. However, it will be noted that the depth of the dimples, when the same are made semi-spherical, should not be greater than the radius of the balls and preferably should be slightly less so that the balls can be cammed out of the dimples when limitation of the torque requires the same. However, when the dimples are made in other shapes, greater or lesser portions of the balls may extend into them depending upon the shape of the dimples, the prime consideration being that the balls or other protrusions will be forced from the dimples or other recesses when the torque requirement exceeds a predetermined value. It is contemplated that the position of the balls and dimples can be reversed so that the balls are in the upper clutch and the dimples in the lower one. Also, the balls can be replaced by protuberances which are fixed to one face of one clutch part and then one of the clutch parts can be made reciprocal toward and away from the other and provided with some means for urging it toward the other clutch part. In such construction, one entire clutch part would move up and down while the clutch is slipping. Thus, the friction clutch can take numerous forms as long as it functions as a friction clutch which will limit the maximum torque applied to the nut to be less or equal to a predetermined amount.

Any suitable depth of cut guage can be provided and a simple one is here illustrated in the form of a dip stick 40 which can be passed through a hole 41 in the upper end of the housing to abut with lock nut 30. The length of the stick can be calibrated in inches or other units so that the distance the boring bar has moved can be readily determined.

In FIG. 4 there is shown an adapter which can be fitted to the lower end of the drilling apparatus to permit it to be attached to different sized tapping valves. As here illustrated, the lower end of housing 10 has been shortened and provided with external threads onto which an adapter 42 has been screwed. The lower end of the adapter has a nipple 43 threaded into it which can be screwed directly into the tapping valve or into a screw flange. Alternately, the adapter can be screwed to the lower end of the FIG. 2 apparatus without modification thereof.

Referring now to FIG. 5, there is illustrated another form of the invention employing the principles discussed above. In this form, the feed rate governing means is illustrated as including a thread 50 on the boring bar and a thread engaging element, preferably a plurality thereof, such as ball 51, carried by the housing. In this particular instance, the housing has an enlarged portion 52, having radially extending bores 53 which support the balls, as well as springs 54 which urge the balls toward the screw thread. Plugs 55 are employed to prevent escape of fluid. In a preferred form, the valleys of thread 50 are semi-spherical to match the contours of the balls. Here again, the depth of the semi-spherical grooves should not be greater than the radius of the balls.

With this construction, it will be seen that as long as the endwise thrust on the boring bar is less than a predetermined value, one of the balls will ride in the valley of the thread, thereby causing the boring bar to move downwardly at a rate determined by the pitch of the thread and the speed of rotation. However, as soon as the boring bar reaches the work piece, the reaction force will increase to a point such that the ball in the thread will be cammed by the flank of the thread out of the thread's valley to be moved outwardly as illustrated by the ball on the right hand side of FIG. 5. At the same time, another ball circumferentially spaced from the original ball will move into the thread valley so as to react with the thread to urge the boring bar downwardly. By using a sufficient number of balls (e.g. four) preferably arranged in a single plane perpendicular to the boring bar, a substantially constant downward thrust will be exerted on the boring bar. Thus, there is a slippage between the thread engaging elements and the thread during the drilling operation and the amount of such slippage determines the maximum drilling force which will be exerted on the bit. Obviously, this amount can be varied by changing strength of springs 54, the depth of the valley of the screw relative to the size of the screw engaging elements, the shape of the latter, etc.

In FIG. 6, there is shown a very simple arrangement which in essence is the reverse of that in FIG. 5. Thus, the housing 10 is formed on its interior with a thread 60 and in this case the boring bar 11 carries balls 61. The balls can be pressed outwardly toward the thread by a suitable resilient means such as spring 62. In its preferred form, thread 60 again has valleys which are substantially semi-spherical to match the contour of ball 61. The crests of the thread are preferably rounded as shown although this is not necessary. In this particular construction, it will be noted that the housing 10 can be relatively short since the feed means permits the boring bar to travel a distance which can be substantially equal to the length of the housing. Also, the boring bar can be made of one piece construction so that its upper end extends above cap 63 for application of rotative force thereto.

The operation of the structure of FIG. 6 is substantially like that of FIG. 5 in that the balls are cammed out of the thread's valley by the flank of the thread to jump the crest of the thread with arrangement being such that as one ball is cammed out, another ball passes into a valley so as to supply a substantially constant thrust to the boring bar.

The apparatus of FIGS. 7 and 8 is particularly designed for manual operation, although it is susceptible of power operation. In this construction, the boring bar 11 is rotatably received in housing 10 and the means for rotating the boring bar can take the form of a handle 70 fitting a non-circular portion 71 of the boring bar and held in place by a nut 72. The means for feeding the boring mechanism longitudinally of the housing includes a sleeve 73 preferably telescoping over the housing and threaded thereto. The sleeve 73 has a force transmitting connection with the boring bar to move the latter longitudinally. This connection can include a thrust bearing 74 and the nut 72 which together hold the boring bar sleeve and handle in a fixed longitudinal relationship with each other. The feeding means includes a slipping friction clutch operating on the principles outlined above. This clutch can include a plurality of dimples or depressions 75 disposed in a transverse plane and about a circumferential face of the sleeve and a part 76 carried by the handle for successively engaging the depressions. As shown, the part 76 comprises a length of rod having its end rounded to fit into the dimples or depressions 75 and to be forced therefrom by the camming action described above, particularly with reference to FIG. 2. The rod is urged toward the dimples by a suitable resilient means such as spring 77 which can have the force it exerts adjusted by a screw 78 in the end of the handle.

With this arrangement, and with the slipping friction clutch designed and adjusted in accordance with the principles above described, it will be seen that as the handle turns, the inner end of the rod 76 will engage a depression whereby torque is transmitted from the handle to the sleeve to cause it to turn and therefore thread downwardly on the housing. As soon as the torque required to turn the sleeve exceeds a predetermined value, rod 76 will be cammed out of a dimple and then moved to engage a succeeding dimple so as to impart a rotation to the sleeve in the same manner as described with reference to the friction clutch in FIG. 2.

By providing feed sleeve 73 around the housing 10 and by connecting it to the boring bar so that its movement is proportional to that of the boring bar, a simple, direct means can be provided for determining the travel of the boring bar. As shown in FIG. 7, such means includes a plurality of indicia disposed along the outer surface of the housing. For example, the outer surface can be scribed with marks one inch apart, with the zero mark flush with the bottom of the feed sleeve when the lower end of the cutter 12 is flush with the lower end of the housing. Then, when the boring bar is moved downwardly, the position of the lower end of the sleeve relative to the indicia 79 will indicate the number of inches the cutter has moved from the lower end of the housing.

It will be appreciated that balls 25 and dimples 28, balls 51 and 61, threads 50 and 60, as well as depressions 75 and rod 76, can take forms other than that shown as long as the various elements coact to provide the limited slippage of the nature described. Also, other forms of clutches can be used if they slip during the cutting operation to yield the desired feed rate governing functions as herein explained.

While a twist type cutter has been shown in the drawings, it will be appreciated that other types can be used. For example, in the larger sizes of drilling apparatus, an annular trepanning cutter can be used along with a suitable pilot drill and coupon recovery means as is now common in the art.

This application is a continuation-in-part of my co-pending application, Serial Number 2,538, filed January 14, 1960, now abandoned.

From the foregoing, it will be seen that this invention is one well adapted to attain all of the ends and objects hereinabove set forth, together with other advantages which are obvious and which are inherent in the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In an apparatus for drilling a hole in a vessel such as a pipe or the like wherein a fluid-tight housing is provided for mounting a rotatable boring mechanism so as to drill a hole in the vessel while substantially preventing flow of fluid into or out of the vessel, the improvement which comprises in combination therewith a feed drive connected to the boring mechanism for moving the boring mechanism longitudinally of the housing and including a slipping friction clutch set to continually slip during the actual drilling of the hole, the rate of slippage varying to vary the feed rate responsive to variations in endwise cutter reaction force in such a manner as to maintain the cutter drilling force substantially constant.

2. The apparatus of claim 1 wherein the clutch includes a thread on the boring mechanism and thread engaging parts carried by the housing and movable toward and away from the boring mechanism and biased inwardly with sufficient force to yield the desired substantially constant cutter drilling force.

3. The apparatus of claim 1 wherein the clutch includes a thread on the inside of the housing and thread engaging parts carried by the boring mechanism for movement toward and away from the housing and biased outwardly with sufficient force to yield the desired constant cutter force.

4. An apparatus for drilling a hole in a vessel such as a pipe or the like while preventing any substantial flow of fluid into or out of the vessel which comprises, in combination, a housing adapted to be mounted on the vessel to form a fluid-tight enclosure and having a thread extending along its inner surface, a boring bar rotatably carried by the housing and movable longitudinally thereof, thread engaging elements carried by the boring bar so as to engage the thread and to be movable laterally thereof, and means resiliently biasing the elements toward the threads, the thread and the elements being shaped so that when the endwise thrust on the boring bar exceeds a predetermined amount, the flanks of the thread cam the elements toward the boring bar so that the elements jump the crest of the thread to the next thread valley to thereby maintain the endwise thrust on the boring bar equal to or less than a predetermined maximum.

5. The apparatus of claim 4 wherein the thread engaging elements are balls and the thread has its root rounded to be substantially the same curvature as that of the balls.

6. The apparatus of claim 4 wherein the boring bar is a unitary structure and extends from the housing for engagement by a torque applying drive member.

7. An apparatus for drilling a hole in a vessel such as a pipe or the like while preventing any substantial flow of fluid into or out of the vessel which comprises, in combination, a housing adapted to be mounted on the vessel to form a fluid-tight enclosure, a boring bar rotatable in the housing and movable longitudinally thereof, the boring bar having a thread on its exterior, thread engaging elements carried by the housing so as to engage the thread and to be movable laterally thereof, and means resiliently biasing the elements toward the thread, the thread and elements being shaped so that when the endwise thrust on the boring bar exceeds a predetermined amount, the flanks of the thread cam the elements outwardly so that the elements jump the crest of the thread to the next valley to thereby maintain the endwise thrust on the boring bar equal to or less than a predetermined maximum.

8. The apparatus of claim 7 wherein said thread engaging elements are balls and the thread has a semi-spherical contour between its crests.

9. An apparatus for drilling a hole in a vessel such as a pipe or the like while preventing any substantial flow of fluid into or out of the vessel which comprises, in combination, a housing adapted to be mounted on the vessel to form a fluid-tight enclosure therewith, a boring bar rotatable in the housing and movable longitudinally thereof, a sleeve telescoping around the housing and threaded thereto and having an endwise force transmitting connection with the boring bar, to move it longitudinally, an operating handle connected to the boring bar to rotate the same, and a slipping friction coupling between the handle and sleeve for turning the sleeve relative to the housing to thereby longitudinally move the boring bar, said coupling having a maximum torque transmitting capacity such that rotation of the sleeve is at a rate which is less than the rate of rotation of the boring bar during at least a part of the drilling operation.

10. The apparatus of claim 9 wherein the coupling comprises a plurality of depressions in a circumferential surface of the sleeve, a part carried by the handle and protruding to successively engage said depressions as the handle is turned, said part being movable toward and away from and biased toward the depressions.

11. The apparatus of claim 10 wherein the part is carried in a hollow portion of the handle positioned to move past said depressions, a spring in said hollow portion urging the part toward the protrusions, and means on the handle to adjust the force exerted by the spring.

12. The apparatus of claim 9 wherein the exterior of the housing is marked along its length with indicia so that as the sleeve telescopes over the housing during the drilling operation, an operator can determine the distance the boring bar travels by observing the position of the sleeve relative to the indicia.

13. An apparatus for drilling a hole in a vessel such as a pipe or the like which comprises, in combination, a rotatable boring mechanism adapted to carry a cutter for cutting said hole, a housing carrying the boring mechanism and adapted to be mounted on the vessel and from which the boring mechanism can be extended, means for rotating the boring mechanism, and means for feeding the boring mechanism longitudinally of the housing including feed rate governing means causing the feed rate to vary responsive to variations in endwise cutter reaction force in a manner such as to maintain the cutter drilling force substantially constant, said feed rate governing means being a friction clutch set to continually slip during the actual drilling of the hole, the rate of slippage varying to vary the feed rate as aforesaid.

14. An apparatus for drilling a hole in a vessel such as a pipe or the like which comprises, in combination, a rotatable boring mechanism adapted to carry a cutter for cutting said hole, a housing carrying the boring mechanism and adapted to be mounted on the vessel and from which the boring mechanism can be extended, means for rotating the boring mechanism, and means for feeding the boring mechanism longitudinally of the housing including feed rate governing means causing the feed rate to vary responsive to variations in endwise cutter reaction force, said feeding means including a thread carried by one of the boring mechanism and housing, and thread engaging elements carried by the other of the boring mechanism and housing, said elements being movable toward and away from the thread and being resiliently biased toward the thread so as to jump across the crest of the thread during the drilling operation to maintain the cutter drilling force substantially constant.

15. An apparatus for drilling a hole in a vessel such as a pipe or the like while preventing any substantial flow of fluid into or out of the vessel which comprises, in combination, a housing adapted to be mounted on the vessel to form a fluid tight enclosure, a rotatable boring bar in the housing and movable longitudinally thereof to extend a cutter carried by the boring bar from said enclosure, a nut threaded to the housing and having an endwise force transmitting connection with the boring bar, and a friction clutch connecting between the boring bar and the nut to apply torque to turn the nut to feed the boring bar, the friction clutch being constructed so that the torque required to cause it to slip is greater than that required to turn the nut at the same speed as the boring bar while the boring bar is being advanced toward the vessel to be drilled but is less than that required to turn the nut at the same speed as the boring bar during actual drilling whereby the boring bar is relatively rapidly advanced without slippage of the clutch and yet the clutch continuously slips during the drilling operation to maintain the cutter drilling force substantially constant.

References Cited in the file of this patent

UNITED STATES PATENTS

| | | |
|---|---|---|
| 1,103,782 | Leopold | July 14, 1914 |
| 2,287,354 | Misch | June 23, 1942 |
| 2,549,702 | Mueller et al. | Apr. 17, 1951 |
| 2,972,915 | Milanovits et al. | Feb. 28, 1961 |